(12) United States Patent
Mitsuda (10) Patent No.: US 7,697,383 B2
(45) Date of Patent: Apr. 13, 2010

(54) OPTICAL DISC REPRODUCING APPARATUS

(75) Inventor: Hiroshi Mitsuda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 395 days.

(21) Appl. No.: 11/878,910

(22) Filed: Jul. 27, 2007

(65) Prior Publication Data

US 2008/0049567 A1   Feb. 28, 2008

(30) Foreign Application Priority Data

Aug. 23, 2006   (JP) .............................. 2006-226459

(51) Int. Cl.
*G11B 7/00* (2006.01)
(52) U.S. Cl. ............... 369/44.41; 369/44.25; 369/44.26
(58) Field of Classification Search ........................ None
See application file for complete search history.

(56) References Cited

U.S. PATENT DOCUMENTS 4,750,163 A * 6/1988 Yamamiya et al. ....... 369/53.12

2006/0158978 A1 * 7/2006 Matsumoto ............... 369/44.41

FOREIGN PATENT DOCUMENTS

JP   A 2000-163765   6/2000
JP   A 2000-315327   11/2000

* cited by examiner

*Primary Examiner*—Joseph H Feild
*Assistant Examiner*—Tawfik Goma
(74) *Attorney, Agent, or Firm*—Morgan Lewis & Bockius LLP (57) ABSTRACT

In the first and second light-receiving regions equally divided into two in parallel with the track of the optical disc, the reflected light received from the optical disk is converted into electric signals and fed out by individual light-receiving regions. Then, the light-receiving ratio indicating the ratio of amounts of received light is calculated from the amplitude of the electric signal generated in the first light-receiving region and the amplitude of the electric signal generated in the second light-receiving region. Then, it is determined whether or not an absolute value of the light-receiving ratio is larger than a predetermined vale. When the absolute value is larger, the movement of the objective lens in a radial direction is corrected by incorporating a predetermined correction value.

9 Claims, 4 Drawing Sheets

OPTICAL DISC REPRODUCING APPARATUS

This application is based on Japanese Patent Application No. 2006-226459 filed on Aug. 23, 2006, the contents of which are hereby incorporated by reference.

BACKGROUND OF THE INVENTION

1. Field of the Invention

The present invention relates to an optical disc reading apparatus for reading information recorded on an optical disc, and more particularly to an optical disc reproducing apparatus capable of correcting a tracking error caused by the lateral vibration (hereinafter, "surface wobbling") of an optical disc or the vibration of a spindle motor.

2. Description of Related Art

Recently, optical discs such as a compact disc (CD) and a digital versatile disc (DVD) have been widely spread and popularly used. As an apparatus for reading information from and reproducing information recorded on the optical disc, for example, audio information or video information, there is provided an optical disc reproducing apparatus. Widely known amongst which are a CD player, a DVD player, and a CD-ROM drive connectable to a PC.

In an optical reproducing apparatus, there is provided an optical pickup device for reading information by irradiating an optical disc with a light beam. The optical pickup device emits a light beam to an information recorded surface of an optical disc that is placed on a turn table and rotating. Then, the light reflected by the optical disc is received by a light-receiving device, for example, a photo diode arranged in the optical pickup device. Thereafter, the light is converted into an electric signal by the light-receiving device so that the information recorded on the optical disc is outputted based on the obtained electric signal.

It is necessary to perform a process (tracking process) by aligning the center axis of the light beam with the center of a series of pits formed on the optical disc so as to read the information from the optical disc accurately. To achieve this, there are provided in the optical pickup device an actuator for driving an objective lens in the radial direction of the optical disc and a tracking servo for controlling the actuator.

Due to various factors, surface wobbling is sometimes caused in the optical disc. There are also cases in which, when the optical disc is placed on the turn table, peripheral edges thereof sag by its own weight, thereby preventing the information recorded surface of the disc from rotating in one plane. When such warpage or sag is minimal, it is possible to maintain a perpendicular relationship between the axis of the light beam and the information recorded surface of tracks. Therefore, the aforementioned tracking process by the tracking servo can be easily performed.

However, when the surface wobbling, the warpage, or the sag is conspicuous, there are some cases in which the relationship between the axis of the light beam and the information recorded surface is largely deviated from the perpendicular relationship. This causes the series of pits on the disc to be read to deviate largely in a radial direction from the axis of the light beam (tracking offset), generating a problem in which the information can not be read.

To deal with the aforementioned problem, JP-A-2000-163765 discloses an optical disc apparatus that performs a tracking control by correcting the tracking offset that is caused in accordance with the shift of the objective lens. The optical reproducing disc apparatus disclosed in JP-A-2000-163765 retains maximum and minimum values of the low frequency components of the phase difference signal obtained by a light-receiving device that is placed in a divided manner and generates a lens-shift detection signal from an average value of the maximum and minimum values. Then, the lens-shift detection signal thus generated is used for correcting the tracking offset.

Also, to deal with the aforementioned problem, JP-A-2000-315327 discloses an optical disc apparatus that performs a highly reliable control when the series of pits on a disc deviates from the optical axis of the light beam after the objective lens is shifted by the tracking servo. When the center of the objective lens is deviated due to the shift of the objective lens at an initial stage because of fitting errors of the optical components or vertical placement of the apparatus, the optical disc apparatus disclosed in JP-A-2000-315327 detects a signal corresponding to the amount of the deviation and makes a correction so that the amount of the deviation will be zero, i.e., so that the objective lens is located at an appropriate position.

The tracking control methods disclosed in JP-A-2000-163765 and JP-A-2000-315327 are complicated with respect to the processing procedures, which will require processing circuits to be newly added and disadvantageously make the construction of the entire apparatus complicated.

SUMMARY OF THE INVENTION

In view of the above, an object of the present invention is to provide an optical disc reproducing apparatus that is capable of securely reading information recorded on a recording surface of an optical disc even if the optical disc causes conspicuous surface wobbling and that is yet simple in structure.

To achieve the above object, according to one aspect of the present invention, an objective lens through which a light beam generated by a light source is irradiated on a recording surface of an optical disc and that receives reflected light from the optical disc; an actuator that moves the objective lens in a radial direction of the optical disc; a light receiving portion that has a first light-receiving region and a second light-receiving region formed therein by being equally divided into at least two areas in a direction parallel to a track of the optical disc and that detects the reflected light from the optical disc by each of the light-receiving regions; an information output portion that feeds out information recorded in a track of the optical disc in accordance with a sum of two output signals resulted from detecting the reflected light by the first and the second light-receiving regions respectively; a light-receiving ratio calculation portion that calculates a light-receiving ratio that is a ratio between an amplitude of an electric signal generated in the first light-receiving region and an amplitude of an electric signal generated in the second light-receiving region; a ratio determination portion that determines whether or not an absolute value of the light-receiving ratio is larger than a predetermined value; a post-correction ratio calculation portion that calculates a post-correction ratio by attaching a sign of the light-receiving ratio to a value obtained by subtracting a predetermined correction value from the absolute value of the light-receiving ratio and that calculates a direction and a distance of the objective lens required to be moved radially so as to make the light-receiving ratio identical with the post-correction ratio when the ratio determination portion determines that the absolute value of the light-receiving ratio is larger than the predetermined value; and a correction parameter memorizing portion that memorizes a result thus calculated by the post-correction ratio calculation portion as a correction parameter. When the actuator moves the objective lens, a movement of the objective lens in a radial direction is corrected based on the correction parameter.

With this arrangement, it is possible to reduce the frequency and the amount of lens correction when an optical disc presenting conspicuous surface wobbling is read. Accordingly, it is possible to perform the tracking control easily and reliably. Furthermore, since the light-receiving area is divided into four regions, it is possible to calculate the light-receiving ratio in various ways. By limiting the range of the light-receiving ratio with values, it is possible to determine if the optical disc is such a disc that presents conspicuous surface wobbling and perform the sufficient correction. It is also possible to correct the movement of the objective lens by such a simple method as adding a correction distance. For such an optical disc that does not present conspicuous surface wobbling, it is also possible to omit unnecessary processing.

In this way, it is possible to reduce the frequency and the amount of lens correction when an optical disc, for example, a DVD-RAM that presents conspicuous surface wobbling is read. Accordingly, it is possible to provide an optical disc reading apparatus capable of performing the tracking control easily and reliably.

DETAILED DESCRIPTION OF PREFERRED EMBODIMENTS

Hereinafter, one embodiment of the present invention will be described with reference to the drawings. However, it is to be noted that the embodiment shown below is an example and the present invention will not be restricted by such an embodiment.

Figure 1:
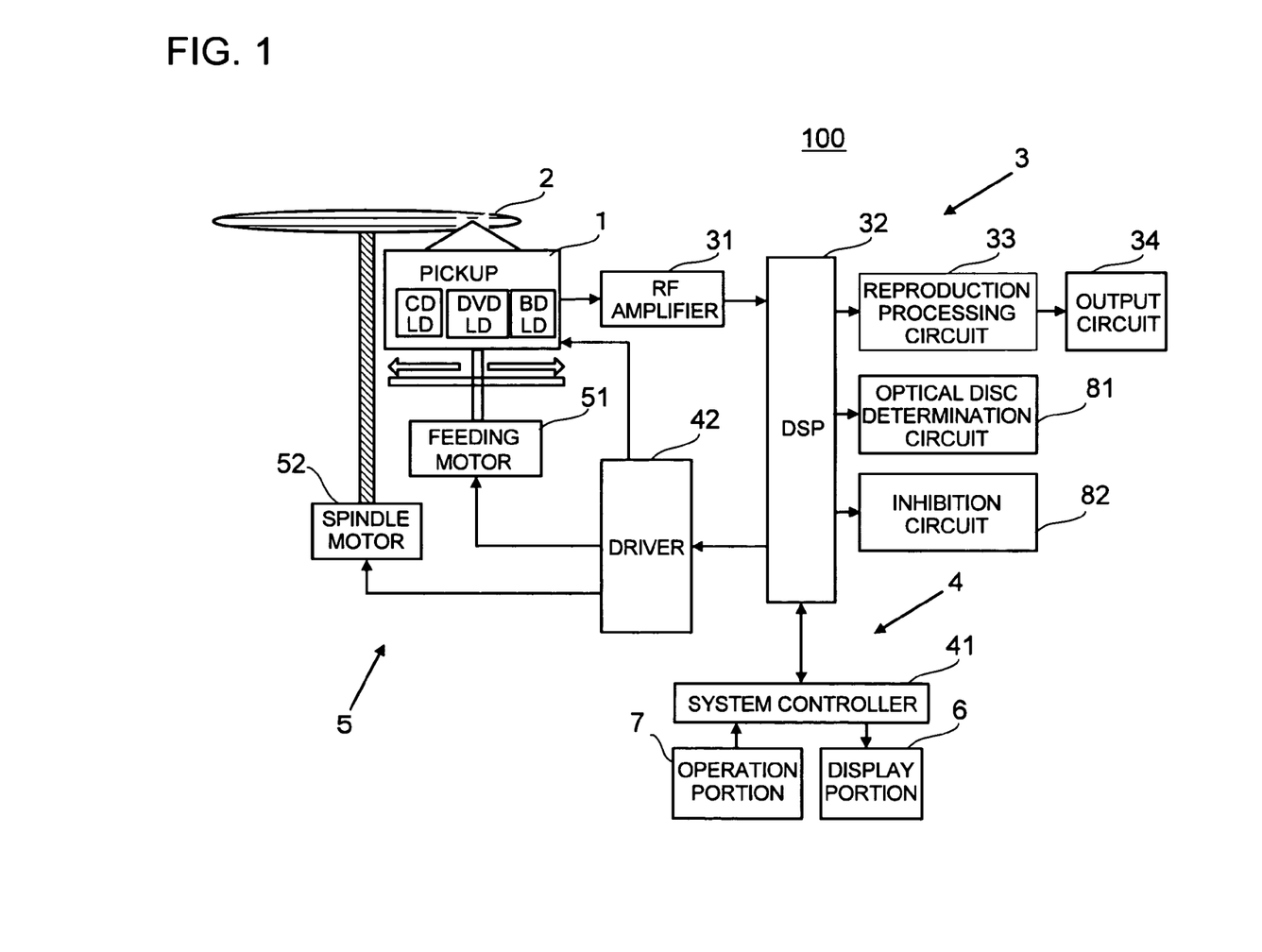
FIG. 1 is a schematic diagram showing a structure of an optical disc reproducing apparatus of one embodiment of the invention.

FIG. 1 is a schematic diagram showing a structure of a disc player of one embodiment of the present invention. A disc player 100 (optical disc reproducing apparatus) comprises an optical pickup device 1, an output device 3, an instruction device 4, a driving device 5, a display portion 6, and an operation portion 7.

The optical pickup device 1 irradiates an optical disc 2 with a light beam and reads various types of information such as audio information and video information recorded on the optical disc 2 (CD, DVD, or BD). This optical pickup device 1 is provided with lasers for CD, DVD, and BD (Blu-ray Disc).

The output device 3 (information output portion) converts such information as audio information and video information from the optical pickup device 1 into an audio signal and a video signal, feeds these signals to an unillustrated loudspeaker and an unillustrated monitor, and is comprised of an RF amplifier 31, a DSP (Digital Signal Processor) 32, a reproduction processing circuit 33, and an output circuit 34.

The RF amplifier 31 amplifies the audio signal, the video signal, and the like from the optical pickup device 1. The DSP 32 and the reproduction processing circuit 33 apply various processing (for example, video image processing) to the signals from the RF amplifier 31 required for reproduction. The output circuit 34 performs D/A converting processing or the like so that the signals from the reproduction processing circuit are outputted to the unillustrated loud speaker and monitor.

The instruction device 4 controls the operation of the optical pickup device 1 and the driving device 5 based on the operational instructions received through the operation portion 7 and comprises a system controller 41 and a driver 42. The system controller 41 receives information from the operation portion 7, transmits it to the DSP 32, and transmits the information from the DSP 32 to the display portion 6. The driver 42 controls the optical pickup device 1 and the driving device 5 based on the instructions from the DSP 32.

The driving device 5 comprises a feeding motor 51 and a spindle motor 52. The feeding motor 51 is driven by the driver 42 that functions based on the instructions from the DSP 32. Through this process, the optical pickup device 1 moves in a radial direction of the optical disc 2. The spindle motor 52, through the driver 42, drives the optical disc 2 in a rotational direction. The driver 42 performs focusing control of the objective lens 17 of the pickup device 1 based on the instructions from the DSP 32.

An optical disc determination circuit 81 determines whether or not the type of the optical disc 2 is a DVD-RAM medium based on an electric signal obtained from the optical pickup device 1 and the output device 3. If it is determined that the disc is not a DVD-RAM medium, then the result of the determination is fed out to an inhibition circuit 82. The inhibition circuit 82 having received the determination result from the optical disc determination circuit 81 instructs the DSP 32 to inhibit the processing of a light-receiving ratio calculation circuit 22 (light-receiving ratio calculation portion), a ratio determination circuit 23 (ratio determination portion), a post-correction ratio calculation circuit 24 (post-correction ratio calculation portion), and a correction parameter memorizing circuit 25 (correction parameter memorizing portion), all of which will be described later. This inhibition instruction will be valid until the disc player 100 detects that another disc 2 is loaded therein.

Figure 2:
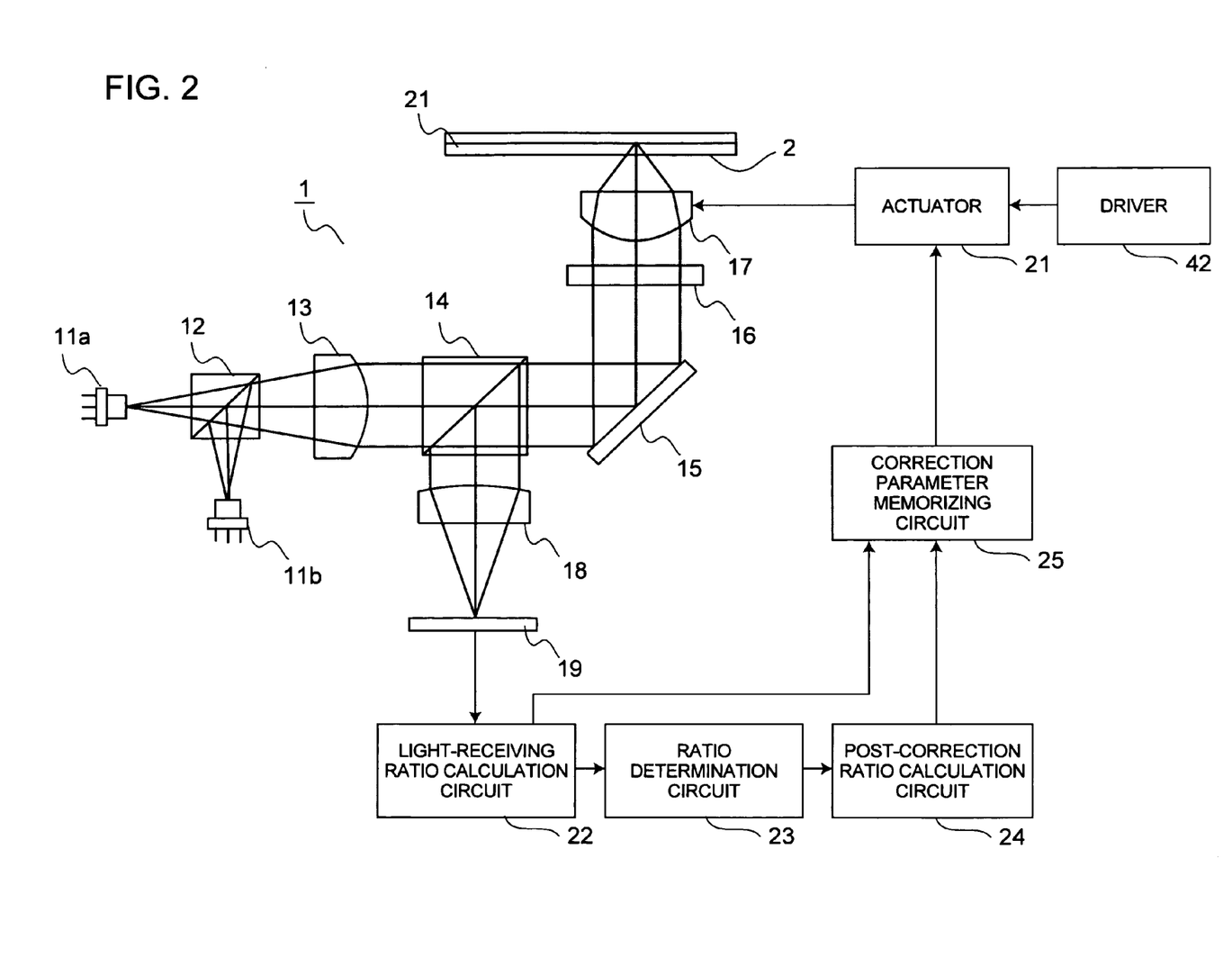
FIG. 2 is a schematic diagram showing a structure of an optical system of the optical disc reproducing apparatus of one embodiment of the invention.

FIG. 2 is a schematic diagram showing an optical system of the optical pickup device 1 of one embodiment of the present invention. The optical pickup device 1 is a device that makes it possible to read the information recorded on the recording surface of the optical disc 2 by irradiating the optical disc 2 with a light beam and receiving the reflected light. It is to be understood that the type and quantity of the disc 2 whose information can be read by the optical pickup device 1 are not limited in any way by the type and quantity shown in this embodiment but may be practiced in any other manner than specifically described above as embodiment, and various modifications are possible within the scope of the invention.

The optical pickup device 1 comprises a first light source 11a, a second light source 11b, a dichroic prism 12, a collimate lens 13, a beam splitter 14, an upward-direction mirror 15, a liquid crystal element 16, the objective lens 17, a detecting lens 18, a photodetector 19, an actuator 21, the light-receiving ratio calculation circuit 22, the ratio determination circuit 23, the post-correction ratio calculation circuit 24, and the correction parameter memorizing circuit 25. Hereinafter, individual optical components constituting the optical pickup device 1 will be described in detail.

The first light source 11a is a semiconductor laser capable of emitting a light beam of a 650 nm band to support a DVD, and the second light source 11b is a semiconductor laser capable of emitting a light beam of a 450 nm band to support a BD. It is to be noted that, although semiconductor lasers each emits only a light beam having a single wavelength are used for the light sources 2 and 3, the present invention is not limited by this embodiment and may be practiced by using a two-wavelength integrated semiconductor laser that has two light-emitting points so that two light beams of different wavelengths can be emitted.

The dichroic prism 12 passes the light beam emitted from the first light source 11a for emitting a light beam for a DVD, while it reflects the light beam emitted from the second light source 11b for emitting a light beam for a BD. Then, the optical axis of the light beam emitted from the first light source 11a is aligned with the optical axis of the light beam emitted from the second light source 11b. The light beam that is passed through or reflected by the dichroic prism 12 is sent to the collimator lens 13.

The collimator lens 13 converts the light beam that has passed through the dichroic prism 12 into parallel rays. Here, the parallel rays mean light in which all optical paths of the light beams emitted from the first light source 11a and the second light source 11b are substantially parallel with the optical axis. The light beams that are converted into the parallel rays by the collimator lens 13 are sent to the beam splitter 14.

The beam splitter 14 works as a light separating element that separates an incident light beam. It passes the light beam from the collimator lens 13 and leads it to the optical disc 2, while it reflects the reflected light from the optical disc 2 and leads it to the photodetector 19 side. The light beam that has passed through the beam splitter 14 is sent to the upward-directing mirror 15.

The upward-directing mirror 15 reflects the light beam that has passed through the beam splitter 14 and leads it to the optical disc 2. The upward-directing mirror 15 is tilted relative to the optical axis of the light beam from the beam splitter 14 by 45 degrees so that the optical axis of the light beam reflected by the upward-directing mirror 15 is made substantially perpendicular to the recording surface of the optical disc 2. The light beam reflected by the upward-directing mirror 15 is sent to the liquid crystal element 16.

The liquid crystal element 16, by a voltage applied to the liquid crystal (not shown) sandwiched between transparent electrodes (not shown), controls a change in refractive index of the liquid crystal by utilizing a property of molecules of the liquid crystal changing their orientation direction, so that a phase of the light beam passing through the liquid crystal element 6 can be controlled. Since the liquid crystal element 16 is arranged, it becomes possible to correct the spherical aberration that is generated by the difference in thickness of a protective layer for protecting the recording surface of the optical disc 2. The light beam that has passed through the liquid crystal element 16 is sent to the objective lens 17.

The objective lens 17 condenses the light beams that have passed through the liquid crystal element 16 onto the recording surface of the optical disc 2. In addition, the objective lens 17 is adapted to be capable of moving in the vertical direction and in the horizontal direction in FIG. 2 when it is driven by the actuator 21 described later, and the position thereof is controlled based on a focus servo signal and a tracking servo signal.

Note that the liquid crystal element 16 is mounted on the actuator 21 in the present embodiment so that it can be moved together with the objective lens 17. However, it is not always necessary to mount the liquid crystal element 16 on the actuator 21, and this arrangement may be modified in accordance with a structure of the optical system.

The light reflected by the optical disc 2 passes through the objective lens 17 and the liquid crystal element 16 in this order, is reflected by the upward-directing mirror 15, is further reflected by the beam splitter 14, and is condensed by the detecting lens 18 onto a light-receiving element (not shown) provided on the photodetector 19.

The photodetector 19 (light-receiving portion) converts the light information that has been received into an electric signal by using a light-receiving element such as a photodiode, and delivers it to the RF amplifier (not shown) or the like, for example. Then, this electric signal is used as a reproduction signal of data recorded on the recording surface and, further, as a servo signal for performing a focus control and a tracking control.

The actuator 21 shifts the objective lens 17 in a radial direction of the optical disc 2 according to a lens driving signal generated and fed out by the driver 42. The actuator 21 may be such that permits a driving current (lens driving signal) to pass through a coil (not shown) placed in a magnetic filed formed by a permanent magnet (not shown) and drives the objective lens 17 by Lorentz force, though the actuator 21 is not limited to this example.

Note that, in the present invention, although the actuator 21 performs a tracking operation by which the objective lens 17 is shifted along the recording surface of the optical disc 2, the actuator 21 may be used, in addition to this, to perform a tilting operation by which the objective lens 17 is tilted and moved so that the optical axis of the laser light from the objective lens 17 swings or to perform a focusing operation in which the objective lens 17 is moved close to or away from the optical disc 2 if necessary.

Upon receiving the output of the photodetector 19, the light-receiving ratio calculation circuit 22 calculates a light-receiving ratio representing the ratio of received light amount from a ratio between an amplitude of an electric signal generated in a first light-receiving region of the photodetector 19 and an amplitude of an electric signal generated in a second light-receiving region. The light-receiving ratio is fed to the ratio determination circuit 23 and the correction parameter memorizing circuit 25. The sum of the electric signals generated in the first and second light-receiving regions is fed out to the unillustrated loudspeaker and monitor as audio information and video information respectively by the output device 3.

The ratio determination circuit 23 determines whether or not the light-receiving ratio entered by the light-receiving ratio calculation circuit 22 is larger than a predetermined value arranged in advance. As a result of this determination, if it is determined that the light-receiving ratio is larger than the predetermined value, the light-receiving ratio entered by the light-receiving ratio calculation circuit 22 is fed out to the post-correction ratio calculation circuit 24. On the other hand, if it is determined that the light-receiving ratio is not larger than the predetermined value, the ratio determination circuit 23 does not output anything at all.

The post-correction ratio calculation circuit 24 calculates the post-correction ratio by subtracting a predetermined correction value from the light-receiving ration entered from the ratio determination circuit 23. This post-correction ratio is then fed to the correction parameter memorizing circuit 25.

The correction parameter memorizing circuit 25 compares the post-correction ration entered from the post-correction ratio calculation circuit 24 and the light-receiving ratio entered from the light-receiving ratio calculation circuit 22, thereby, calculates a parameter (correction parameter) representing which radial direction (inward or outward) and how much the objective lens 17 should be moved so that the value of the light-receiving ratio is changed and becomes equal to the value of the post-correction ratio, and temporarily memorizes the calculated parameter in a memorizing medium (not shown). The correction parameter thus memorized is referred to when the actuator 21 moves the objective lens 17 radially. When the actuator 21 moves the objective lens 17 radially, the actuator 21 adds the distance represented by the correction parameter to the moving distance in a radial direction instructed by the driver 42 to produce a total distance and moves the objective lens 17 radially toward the direction represented by the correction parameter and for the amount of total distance.

Figure 3:
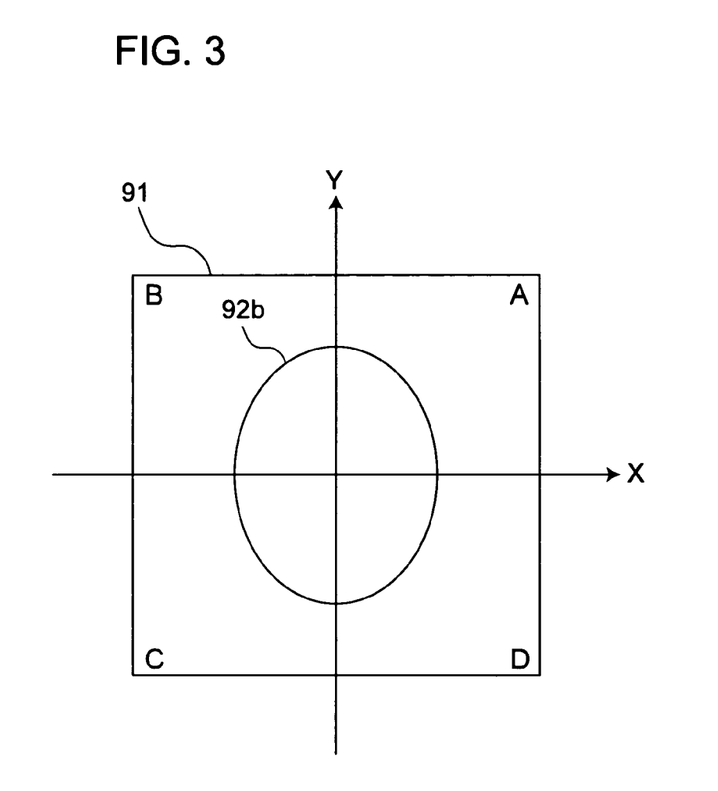
FIG. 3 is a schematic diagram showing one example of a light-receiving balance in an electric signal detected by a light-receiving device in a plurality of light-receiving regions.
Figure 4:
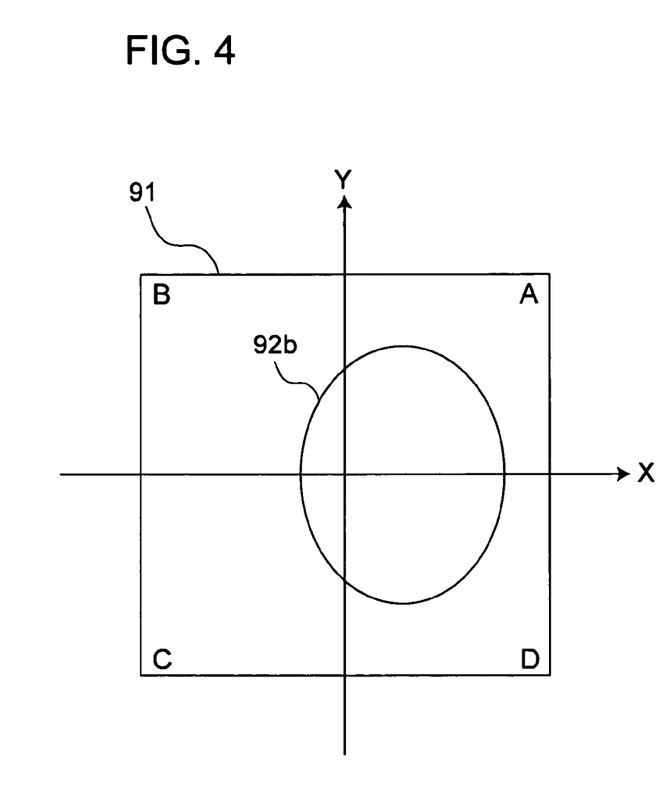
FIG. 4 is a schematic diagram showing one example of a light-receiving balance in an electric signal detected by a light-receiving device in a plurality of light-receiving regions.

Next, description will be made of a balance of electric signals (light-receiving balance) outputted by the light-receiving regions of the photodetector 19 of this embodiment. FIGS. 3 and 4 are schematic diagrams showing a light-receiving balance of the electric signals detected by a plurality of light-receiving regions of the light-receiving device provided in the photodetector 19. FIGS. 3 and 4 show one example of the result detected by a quadrisect light-receiving device 91 that optically divide the light beams reflected by the optical disc 2. Note that the quadrisect light-receiving device 91 is divided into four regions including a light-receiving region A (first light-receiving region A), a light-receiving region B (second light-receiving region A), a light-receiving region C (second light-receiving region B), a light-receiving region D (first light-receiving region B).

When the optical axis of the objective lens 17 relative to the optical disc 2 coincides with the track of the optical disc 2 in a radial direction, i.e., the surface wobbling is not present, and, thus deviation in a radial direction is not present, the PD balance 92a (visually displaying the ratio of the light-receiving amount in each light-receiving region) detected by the quadrisect light-receiving device 91 shows that it is positioned bilaterally symmetric relative to the lateral center split line (Y-axis) of the light-receiving device as a center. In this case, the light-receiving ratio P is zero.

If it is assumed that the amount of received light in the light-receiving region A is XA; the amount of received light in the light-receiving region B is XB; the amount of received light in the light-receiving region C is XC; and the amount of received light in the light-receiving region D is XD, the light-receiving ratio P will be obtained by the following equation.

$$P=\{(XA+XD)-(XB+XC)\}/\{(XA+XD)+(XB+XC)\}$$

In FIGS. 3 and 4, the X-axis shows the radial direction of the optical disc 2, and the larger the value is (right side in FIG. 4), the more outer side of the optical disc 2 it shows. Accordingly, as shown in the example in FIG. 4, if P becomes larger than 0, it means that the optical disc is deviated toward outer side in a radial direction.

If the surface wobbling of the disc 2 is so large that the optical axis of the objective lens 17 is deviated in a radial direction off the track of the optical disc 2, the PD balance 92b is positioned asymmetric relative to the center split line as shown in FIG. 4. In this case, the light-receiving ratio P is not zero. This means that the polarity of the light-receiving ratio (>0 or <0) indicates in which radial direction the objective lens 17 is deviated. When the direction of the deviation is found, then it becomes possible to control the position of the objective lens so as to minimize the deviation in that direction.

Next, the tracking control process in this embodiment of the present invention will be described with reference to the block diagrams in FIGS. 1 and 2, the schematic diagrams in FIGS. 3 and 4, and the flowchart in FIG. 5.

Figure 5:
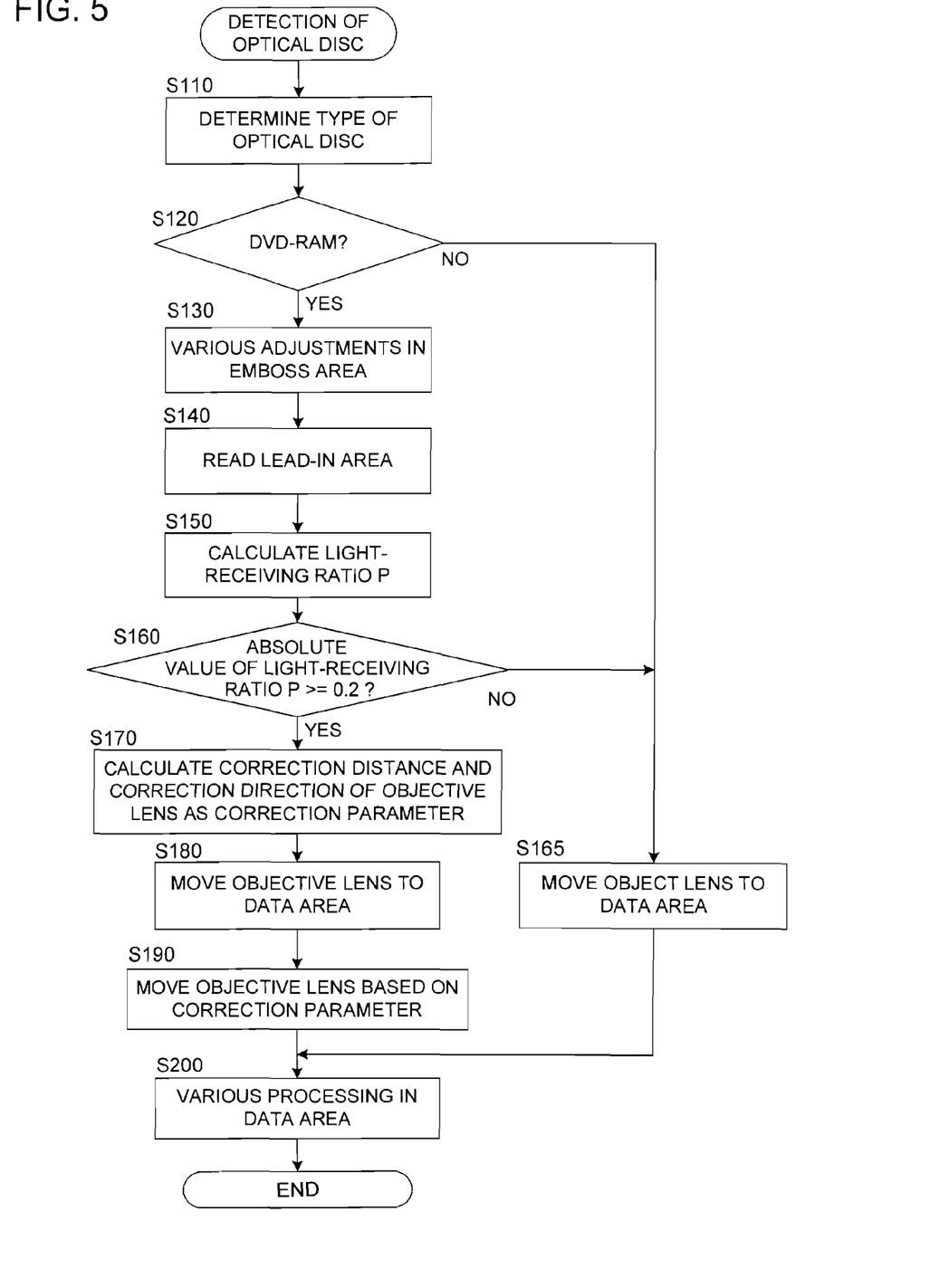
FIG. 5 is a flowchart showing a process flow of lens shift processing in one embodiment of the invention.

FIG. 5 is a flowchart showing a flow of the tracking control process in one embodiment of the invention. As shown in FIG. 5, the process starts when the loading of the optical disc 2 into the disc player 100 is detected.

The optical disc determination circuit 81 that has detected the loading of the optical disc 2 determines the type of the optical disc from the identification information included in the optical disc 2 in step S110. Then, in step S120, the type of the optical disc thus determined is checked to see if it is, for example, a DVD-RAM or not. If it is determined that the optical disc is a DVD-RAM, the process moves to the next step S130. By contrast, if it is determined that the optical disc is not a DVD-RAM (for example, the disc is a DVD-ROM or a CD-ROM), the process moves to step S165 which will be explained later.

Next, in step S130, the instruction device 4 instructs the optical pickup device 1 to perform various adjustment processing with respect to the emboss area of the optical disc 2. Here, since the various adjustment processing with respect to the emboss area is the same as that performed in the conventional art, the description thereof is omitted.

Next, in step S140, the instruction device 4 instructs the optical pickup device 1 and the output device 3 to perform a reading process to read from the lead-in area of the optical disc 2. The lead-in area is an area placed in front of a session which is a unit of a data group, for example, in a CD, and a table of contents for the session, track information, and the like are recorded in the lead-in area.

Then, in step S150, the light-receiving ratio calculation circuit 22 calculates the light-receiving ratio P from an electric signal fed out from the photodetector 19 equipped in the optical pickup device 1. As described previously, the photodetector 19 is divided into four light-receiving regions, and each of the divided regions converts the reflected light into an electric signal and feeds it out. The photo detector 19 calculates the light-receiving ratio P based on the ratio between the amplitude of the electric signals generated in the first light-receiving region consisting of the light-receiving regions A and D and the amplitude of the electric signals generated in the second light-receiving region consisting of the light-receiving regions B and C. The equation used for this calculation has been already described.

Next, in step S160, the ratio determination circuit 23 determines whether or not the absolute value of the light-receiving ratio calculated by the light-receiving ratio calculation circuit 22 is larger than "0.2". When it is not larger than "0.2", the process moves to step S165, and the driving device 5 moves the optical pickup device 1 into the data area (area in which audio information and video information are recorded) of the optical disc 2. Thereafter, the process moves to step S200. Then, in step S200, data is read out from the data area and fed out by using the optical pickup device 1 and the output device 3, and the process ends.

On the contrary, when the absolute value of the light-receiving ratio calculated by the light-receiving ratio calculation circuit 22 is larger than "0.2", the post-correction ratio calculation circuit 24 calculates a corrected moving amount of the objective lens 17 in step S170. In other words, the post-correction ratio is calculated by subtracting "0.05" from the absolute value of the light-receiving ratio to obtain a resultant value and attaching the sign of the light-receiving ratio to the resultant value. For example, if it is assumed that the light-receiving ratio is "−0.22", a value "0.05" is subtracted from the absolute value of the light-receiving ratio to produce "0.17", and the sign of the light-receiving ratio (in this case "−") is attached to "0.17" to obtain the post-correction ratio of "−0.17". Then, the post-correction ratio calculation circuit 24 calculates which radial direction (inward or outward) and how much distance the object lens 17 should be moved so as to change the value of the light-receiving ratio actually calculated (in this case, "−0.22") by the light-receiving ratio calculation circuit 22 to the value of the post-correction ratio (in this case, "−0.17"). The parameter including the moving direction calculated in this way (correction parameter) is temporarily memorized in a memorizing medium such as a memory (not shown) by the correction parameter memorizing circuit 25.

Next, in step S180, the driving device 5 moves the optical pickup device 1 toward the data area of the optical disc 2. Then, in step S190, the actuator 21 moves the objective lens 17 radially by a distance and to a direction which are obtained as a result of factoring the correction parameter into the moving distance in a radial direction instructed by the instruction device 4. While the process in step 190 is repeated, the output device 3 reads the information from the optical disc 2 in step 200. When the process for reading the information is completed, the current processing ends.

Other Embodiments

Although the present invention is described with the preferred embodiment and examples above, the present invention is not limited to the above-described embodiment and examples but can be modified variously in the scope of its technical concept.

Accordingly, the present invention is also applicable to the following embodiments. In the present invention, descriptions are made of such a case in which the light-receiving area is divided into four in a crisscross pattern. However, the light-receiving area may be divided equally into two in a direction parallel to the track of the optical disc 2. In this case, it is possible to simplify the process of calculating the light-receiving ratio. On the other hand, the light-receiving area may be divided into small regions (for example, 16 regions). In such a case, it is possible to formulate various methods to calculate the light-receiving ratio.

In this embodiment, although the descriptions are made of lens shift processing on a DVD-RAM as an example of the optical disc 2 which is prone to cause conspicuous surface wobbling, the lens shift processing may be performed on all types of optical discs. It is also possible to perform the lens shift processing of present invention on a particular type of optical disc other than DVD-RAM.

In this embodiment, although the determination whether or not to perform the lens shifting processing is made for such a case in which the absolute value of the light-receiving ratio is larger than 0.2, and the correction value is set to 0.05, other values may be used. For example, if the correction value is set to 0.1, the effect of the correction is increased.

In this embodiment, the disc player 100 having the pickup 1 is described as an example. However, this embodiment is also applicable to an optical recording apparatus for writing information on an optical disc. In this case, however, the optical recording apparatus should include an optical disc reading function.

In this embodiment, although the DSP 32 is used and described as a device for performing various information processing to reproduce the information, at least one of the functions achieved by the DSP 32 may be performed by a circuit.

In this embodiment, there are provided the light-receiving ratio calculation, 22 the ratio determination circuit 23, the post-correction ratio calculation circuit 24, the correction parameter memorizing circuit 25, the optical disc determination circuit 81, and the inhibition circuit 82 for performing a tracking control. However, it is also possible to realize the tracking control of the present invention by executing a program having functions identical to the plurality of circuits.

What is claimed is:

1. An optical disc reproducing apparatus comprising:

an objective lens through which a light beam generated by a light source is irradiated on a recording surface of an optical disc and that receives reflected light from the optical disc;

an actuator that moves the objective lens in a radial direction of the optical disc;

a light receiving portion that has a first light-receiving region and a second light-receiving region formed therein by being equally divided into at least two areas in a direction parallel to a track of the optical disc and that detects the reflected light from the optical disc by each of the light-receiving regions;

an information output portion that feeds out information recorded in a track of the optical disc in accordance with a sum of two output signals resulted from detecting the reflected light by the first and the second light-receiving regions respectively;

a light-receiving ratio calculation portion that calculates a light-receiving ratio that is a ratio between an amplitude of an electric signal generated in the first light-receiving region and an amplitude of an electric signal generated in the second light-receiving region;

a ratio determination portion that determines whether or not an absolute value of the light-receiving ratio is larger than a predetermined value;

a post-correction ratio calculation portion that calculates a post-correction ratio by attaching a sign of the light-receiving ratio to a value obtained by subtracting a predetermined correction value from the absolute value of the light-receiving ratio and that calculates a direction and a distance of the objective lens required to be moved radially so as to make the light-receiving ratio identical with the post-correction ratio when the ratio determination portion determines that the absolute value of the light-receiving ratio is larger than the predetermined value; and a correction parameter memorizing portion that memorizes a result thus calculated by the post-correction ratio calculation portion as a correction parameter, wherein, when the actuator moves the objective lens, a movement of the objective lens in a radial direction is corrected based on the correction parameter.

2. The optical disc reproducing apparatus according to claim 1, wherein the light-receiving portion comprises a light-receiving element, the first light-receiving region of the light-receiving element is equally divided into two in a direction parallel to a radial direction of the optical disc so as to form a first light-receiving region A and a first light-receiving region B, the second light-receiving region of the light-receiving element is equally divided into two in a direction parallel to a radial direction of the optical disc so as to form a second light-receiving region A and a second light-receiving region B, and the light-receiving element detects the reflected light from the optical disc by each of the four light-receiving regions.

3. The optical disc reproducing apparatus according to claim 2,
  wherein the light-receiving ratio calculation portion sums up amplitudes of signals generated by the first light-receiving region A and the first light-receiving region B as a first light-receiving amount, sums up amplitudes of signals generated by the second light-receiving region A and the second light-receiving region B as a second light-receiving amount, and divides a value obtained by subtracting the second light-receiving amount from the first light-receiving amount by a sum of the first light-receiving amount and the second light-receiving amount to obtain the light-receiving ratio;
  the ratio determination portion determines whether or not an absolute value of the light-receiving ratio is larger than 0.2; and,
  when the absolute value of the light-receiving ratio is larger than 0.2, the post-correction ratio calculation portion attaches a sign of the light-receiving ratio to a value obtained as a result of subtracting 0.05 from the absolute value of the light-receiving ratio so as to calculate the post-correction ratio.

4. The optical disc reproducing apparatus according to claim 2,
  wherein the light-receiving element comprises a photodiode.

5. The optical disc reproducing apparatus according to claim 3,
  wherein the light-receiving element comprises a photodiode.

6. The optical disc reproducing apparatus according to claim 1, further comprising:
  an optical disc determination portion that reads an identification information included in a lead-in area of the optical disc and determines a type of the optical disc based on the identification information; and
  an inhibition portion that inhibits processing of the light-receiving ratio calculation portion, the ratio determination portion, the post-correction ratio calculation portion, and the correction parameter memorizing portion when the optical disc determination portion determines that the type of the optical disc is not a DVD-RAM medium.

7. The optical disc reproducing apparatus according to claim 2, further comprising:
  an optical disc determination portion that reads an identification information included in a lead-in area of the optical disc and determines a type of the optical disc based on the identification information; and
  an inhibition portion that inhibits processing of the light-receiving ratio calculation portion, the ratio determination portion, the post-correction ratio calculation portion, and the correction parameter memorizing portion when the optical disc determination portion determines that the type of the optical disc is not a DVD-RAM medium.

8. The optical disc reproducing apparatus according to claim 3, further comprising:
  an optical disc determination portion that reads an identification information included in a lead-in area of the optical disc and determines a type of the optical disc based on the identification information; and
  an inhibition portion that inhibits processing of the light-receiving ratio calculation portion, the ratio determination portion, the post-correction ratio calculation portion, and the correction parameter memorizing portion when the optical disc determination portion determines that the type of the optical disc is not a DVD-RAM medium.

9. An optical disc reproducing apparatus comprising:
  an objective lens through which a light beam generated by a light source is irradiated on a recording surface of an optical disc and that receives reflected light from the optical disc;
  an actuator that moves the objective lens in a radial direction of the optical disc;
  a photodetector that comprises a photodiode and has a first light-receiving region and a second light-receiving region formed therein by being equally divided into two areas in a direction parallel to a track of the optical disc and that detects the reflected light from the optical disc by each of the light-receiving region, the first light-receiving region being equally divided into two in a direction parallel to a radial direction of the optical disc so as to form a first light-receiving region A and a first light-receiving region B, the second light-receiving region being equally divided into two in a direction parallel to a radial direction of the optical disc so as to form a second light-receiving region A and a second light-receiving region B, and the photodetector detecting the reflected light from the optical disc by each of the four light-receiving regions;
  an information output portion that feeds out information recorded in a track of the optical disc in accordance with a sum of four output signals resulted from detecting the reflected light by each of the light-receiving regions of the photodetector respectively;
  a light-receiving ratio calculation portion that sums up amplitudes of signals generated by the first light-receiving region A and the first light-receiving region B as a first light-receiving amount, sums up amplitudes of signals generated by the second light-receiving region A and the second light-receiving region B as a second light-receiving amount, and divides a value obtained by subtracting the second light-receiving amount from the first light-receiving amount by a sum of the first light-receiving amount and the second light-receiving amount so as to obtain a light-receiving ratio;
  a ratio determination portion that determines whether or not an absolute value of the light-receiving ratio is larger than 0.2;
  a post-correction ratio calculation portion that calculates a post-correction ratio by attaching a sign of the light-receiving ratio to a value obtained by subtracting 0.05 from the absolute value of the light-receiving ratio and that calculates a direction and a distance of the objective lens required to be moved radially so as to make the light-receiving ratio identical with the post-correction ratio when the ratio determination portion determines that the absolute value of the light-receiving ratio is larger than 0.2;
  a correction parameter memorizing portion that memorizes a result thus calculated by the post-correction ratio calculation portion as a correction parameter as a correction parameter;
  an optical disc determination portion that reads an identification information included in a lead-in area of the optical disc and determines a type of the optical disc based on the identification information; and
  an inhibition portion that inhibits processing of the light-receiving ratio calculation portion, the ratio determination portion, the post-correction ratio calculation portion, and the correction parameter memorizing portion when the optical disc determination portion determines that the type of the optical disc is not a DVD-RAM medium,
wherein, when the actuator moves the objective lens, the actuator moves the objective lens a distance and a course in a radial direction obtained as a result of factoring the course and the distance memorized in the correction parameter memorizing portion into a course and a distance in a radial direction which are originally instructed.

* * * * *